US008014912B2

(12) United States Patent
Zadrozynski et al.

(10) Patent No.: US 8,014,912 B2
(45) Date of Patent: Sep. 6, 2011

(54) METHOD AND DEVICE FOR AIDING THE PILOTING OF AN AIRPLANE DURING AN APPROACH PHASE

(75) Inventors: Didier Zadrozynski, Toulouse (FR); Isabelle Lacaze, Colomiers (FR); Jean-Pierre Demortier, Maurens (FR); Bénédicte Michal, Toulouse (FR); Adrien Ott, Toulouse (FR); Frédéric Lemoult, Toulouse (FR)

(73) Assignee: Airbus France, Toulouse (FR)

( * ) Notice: Subject to any disclaimer, the term of this patent is extended or adjusted under 35 U.S.C. 154(b) by 559 days.

(21) Appl. No.: 11/934,608

(22) Filed: Nov. 2, 2007

(65) Prior Publication Data

US 2008/0140272 A1 Jun. 12, 2008

(30) Foreign Application Priority Data

Nov. 8, 2006 (FR) ..................................... 06 09746

(51) Int. Cl.

| | |
|---|---|
| ***G06G 7/00*** | (2006.01) |
| ***G08B 21/00*** | (2006.01) |
| ***G05D 1/04*** | (2006.01) |
| ***G06F 17/00*** | (2006.01) |

(52) U.S. Cl. ............ 701/16; 701/18; 340/945; 340/970; 244/180

(58) Field of Classification Search .................. 701/3, 4, 701/7–8, 14–16, 18; 340/945, 951, 963, 340/970, 971, 972, 973, 976, 977; 244/75.1, 244/180, 185–188, 194–195; 73/178 T
See application file for complete search history.

(56) References Cited

U.S. PATENT DOCUMENTS

| | | | | |
|---|---|---|---|---|
| 5,398,186 A * | 3/1995 | Nakhla | ........................... | 701/16 |
| 5,523,949 A * | 6/1996 | Agate et al. | ...................... | 701/17 |
| 2003/0171856 A1* | 9/2003 | Wilf | ................................ | 701/16 |
| 2004/0075586 A1 | 4/2004 | Glover | | |

FOREIGN PATENT DOCUMENTS

| | | |
|---|---|---|
| EP | 0967461 | 12/1999 |
| FR | 2885439 | 11/2006 |

* cited by examiner

*Primary Examiner* — Jack Keith
*Assistant Examiner* — Edward Pipala
(74) *Attorney, Agent, or Firm* — Dickinson Wright PLLC

(57) ABSTRACT

A method and device for aiding the piloting of an airplane includes: (1) determining current values of flight parameters of the airplane, (2) determining, with the aid of the current values, an approach distance that corresponds to a distance in a horizontal plane between the current position of the airplane and a position of contact with the ground, and (3) presenting the approach distance on a screen.

10 Claims, 7 Drawing Sheets

METHOD AND DEVICE FOR AIDING THE PILOTING OF AN AIRPLANE DURING AN APPROACH PHASE

BACKGROUND OF THE INVENTION

The present invention relates to a method and a device for aiding the piloting of an airplane, in particular of a transport airplane, during an approach phase with a view to landing on an airport landing runway.

It is known that a significant proportion of airplane accidents occur during an approach phase with a view to landing. The main causes of accidents relate in general to:

- unanticipated meteorological conditions;
- inappropriate reactions of pilots;
- a nonoptimal aerodynamic configuration of the airplane; and
- a nonstabilized approach of the airplane (which is too high and/or arrives too quickly).

In most cases, had the crews of the airplane been aware that the real situation of their airplane did not allow a landing to be carried out under good safety conditions, they would have been able to avoid these incidents by performing a go-around.

It is also known that a go-around is a generally tricky maneuver which is often carried out too late since it is not desired. A go-around is in fact often still considered to be a failure for pilots. So, pilots will in general seek to avoid it to the maximum, if necessary by trying to rescue a difficult situation.

However, if such a go-around maneuver were carried out wittingly whenever necessary, it would make it possible to avoid numerous incidents and accidents that occur in the approach phase (approach to a runway and landing on this runway).

The present invention relates to a method of aiding the piloting of an airplane during an approach phase with a view to landing, and more precisely to a method of aiding the management of energy in the approach, which is aimed at aiding the pilot to take his decision in particular as to whether or not to interrupt the approach phase with a go-around maneuver, in particular by indicating to him all the energy margins for attaining a stabilized approach.

DESCRIPTION OF THE PRIOR ART

Document US-2004/0167685 discloses a method for determining a point of contact of an airplane with the ground. To do this, this known document provides in particular:

- to determine the current values of flight parameters of the airplane;
- to determine, with the aid of said current values, a position of contact with the ground and a horizontal distance; and
- to present an alert signal to a pilot of the airplane, on a screen, in the event of a problem with the landing.

Additionally, document US-2004/0075586 discloses a system for monitoring an approach, which makes it possible to provide information about the energy and to forewarn the pilot in the event of a risk concerning the landing.

It will be noted that the predictive distance calculation, when it is solved on the basis of fundamental dynamics equations, may show itself to be very complex and expensive in terms of calculation time. Moreover, the indications provided to the pilot are not necessarily relevant throughout the flight.

SUMMARY OF THE INVENTION

The present invention relates to a method of aiding the piloting of an airplane during an approach phase with a view to landing, which makes it possible to remedy the aforesaid drawbacks.

For this purpose, according to the invention, said method according to which the following series of successive steps is carried out in an automatic and repetitive manner:

a) the current values of flight parameters of the airplane are determined;

b) at least one approach distance which corresponds to a distance in a horizontal plane between the current position of the airplane and a position of contact with the ground is determined at least with the aid of said current values; and c) at least this approach distance is (or is not) presented to a pilot of the airplane on a viewing screen (preferably a navigation screen) as a function of flight conditions, is noteworthy in that, in step b):

b1) a descent profile is determined which illustrates an evolution in terms of speed and altitude of the airplane between the current position and a position of contact with the ground;

b2) transition points which on each occasion are formed by a particular speed and a particular height are determined along said descent profile;

b3) a total height which represents the height at which the airplane would be found with the same energy, but at zero speed, is determined for each of these transition points; and b4) a plurality of individual distances ΔXi is calculated from the current position of the airplane and up to the ground contact position, on each occasion between two successive transition points Pi+1 and Pi which exhibit respective total heights HTi+1 and HTi, this being done with the aid of the following expression:

$$\Delta Xi = \int_{HTi}^{HTi+1} \left[ 1 \Big/ \left( \frac{dHT}{dX}(HT) \right) \right] \cdot dHT$$

in which HT is a total height; and b5) the various individual distances calculated in step b4) are summed so as to obtain said approach distance.

Thus, by virtue of the invention, the approach distance (which corresponds to the distance in a horizontal plane between the current position of the airplane and a position of contact with the ground) is calculated in a particularly accurate manner, and the implementation of the method requires a low calculation time.

Moreover, this approach distance is presented or not on the viewing screen, in particular a navigation screen, as a function of said flight conditions specified hereinbelow.

According to the invention, said descent profile is:

- either a standard descent profile which corresponds to a standard approach procedure, in accordance with aeronautical directives;
- or an optimized descent profile which corresponds to an optimized approach procedure making it possible to obtain a minimum approach distance, as a function in particular of the aerodynamic braking capabilities of the airplane and of current flight parameters.

It will be noted that in the above expression for ΔXi, the term $$\frac{dHT}{dX}(HT)$$

depends on the total ground slopes at the limits of the relevant segment. A total slope illustrates the evolutional trend of the total height, and a total ground slope illustrates the total slope in the ground reference frame.

In a preferred embodiment, in step c), said approach distance is presented on the viewing screen in the form of a circular arc which depends on a position relating to the airplane and which illustrates said position of contact with the ground.

Furthermore, in a particular embodiment:

in step b), two approach distances are determined, namely a minimum approach distance and a standard approach distance which relate respectively to an optimized approach procedure and to a standard approach procedure as mentioned above; and in step c), these two approach distances are (or are not) presented on the viewing screen as a function of said flight conditions.

In this case, preferably, in step c), the following are presented on said viewing screen, in particular a navigation screen:

said standard approach distance, in the form of a first circular arc which depends on a position relating to the airplane and which illustrates the position of contact with the ground relating to a standard approach;

said minimum approach distance, in the form of a second circular arc which depends on said position relating to the airplane and which illustrates the position of contact with the ground relating to an optimized approach; and a symbol which illustrates the position of a landing runway scheduled for the landing and which indicates at least the threshold of this landing runway, in such a way as to highlight one of the following three situations:

a normal situation, when said first and second circular arcs are situated upstream of said threshold of the landing runway;

an alert situation, when said first circular arc is situated downstream of said threshold of the landing runway and said second circular arc is situated upstream of said threshold of the landing runway; and an alarm situation, when said first and second circular arcs are situated downstream of said threshold of the landing runway.

Consequently, in a normal situation, the pilot knows that he can continue the approach procedure in progress, which will enable him to land on the landing runway.

On the other hand, in an alert situation (that is to say when said first circular arc oversteps said threshold of the landing runway), the pilot knows that it will be impossible for him to achieve stabilized-approach conditions if he continues to fly according to the standard approach procedure in progress. However, it is possible for him to achieve stabilized-approach conditions if he flies according to an optimized approach procedure, since said second circular arc is still situated upstream of said threshold of the landing runway. In this case, the actions that the pilot is recommended to carry out are:

to follow the optimized approach procedure; or if despite everything he intends making a standard approach, to use the air brakes and to extend the slats and the flaps as well as the landing gear earlier than scheduled, if of course the speeds so permit; or else to modify the lateral trajectory.

Furthermore, in the alarm situation, for which the two circular arcs are situated beyond the threshold of the landing runway, the pilot knows that in the current state it will be impossible for him to achieve stabilized-approach conditions, regardless of the approach procedure that he uses. In this case, the actions that he is recommended to carry out are, either a modification of the lateral trajectory if this is still possible, or a go-around.

Thus, by virtue of said (first and second) circular arcs and of said symbol presented on the navigation screen, the pilot is afforded valuable aid in taking his decision to possibly interrupt an approach phase. Moreover, in the alarm situation, he no longer needs to hesitate to carry out a go-around maneuver. This will without doubt make it possible to avoid numerous incidents and accidents during the approach phase, and to better manage the approach so as to reduce the number of go-arounds in particular.

Additionally, in step c), a distance to destination is determined;

the approach distance determined in step b) is compared with this distance to destination; and as a function of the result of this comparison and of the current flight phase of the airplane (illustrating said aforementioned flight conditions), said approach distance is or is not presented on the viewing screen.

Thus, the approach distance is displayed on the viewing screen only if it is useful to the pilot and necessary, as a function of particular flight conditions specified further hereinbelow.

The present invention also relates to a device for aiding the piloting of an airplane, in particular a transport airplane, during an approach phase with a view to landing on a landing runway of an airport.

According to the invention, said device of the type comprising:

first means for determining the current values of flight parameters of the airplane;

second means for determining at least one approach distance which corresponds to a distance in a horizontal plane between the current position of the airplane and a position of contact with the ground at least with the aid of said current values; and display means for presenting to a pilot of the airplane, on a viewing screen, at least this approach distance, doing so as a function of flight conditions, is noteworthy in that said second means comprise:

means for determining along a descent profile transition points which are formed on each occasion by a particular speed and a particular height, said descent profile illustrating an evolution in terms of speed and altitude of the airplane between the current position and the position of contact with the ground;

means for determining, for each of these transition points, a total height which represents the height at which the airplane would be found with the same energy, but at zero speed; and means for calculating, from the current position of the airplane and up to the ground contact position, a plurality of individual distances $\Delta Xi$, on each occasion between two successive transition points $Pi+1$ and $Pi$ which exhibit respective total heights $HTi+1$ and $HTi$, with the aid of the following expression:

$$\Delta Xi = \int_{HTi}^{HTi+1} \left[ 1 \Big/ \left( \frac{dHT}{dX}(HT) \right) \right] \cdot dHT$$

in which HT is a total height; and means for summing the various individual distances $\Delta Xi$ thus calculated in such a way as to obtain said approach distance.

In a particular embodiment, said device comprises, moreover, means for controlling said display means concerning the displaying of said approach distance.

BRIEF DESCRIPTION OF THE DRAWINGS

The figures of the appended drawing will elucidate the manner in which the invention may be embodied. In these figures, identical references denote similar elements.

DESCRIPTION OF THE PREFERRED EMBODIMENTS

Figure 1:
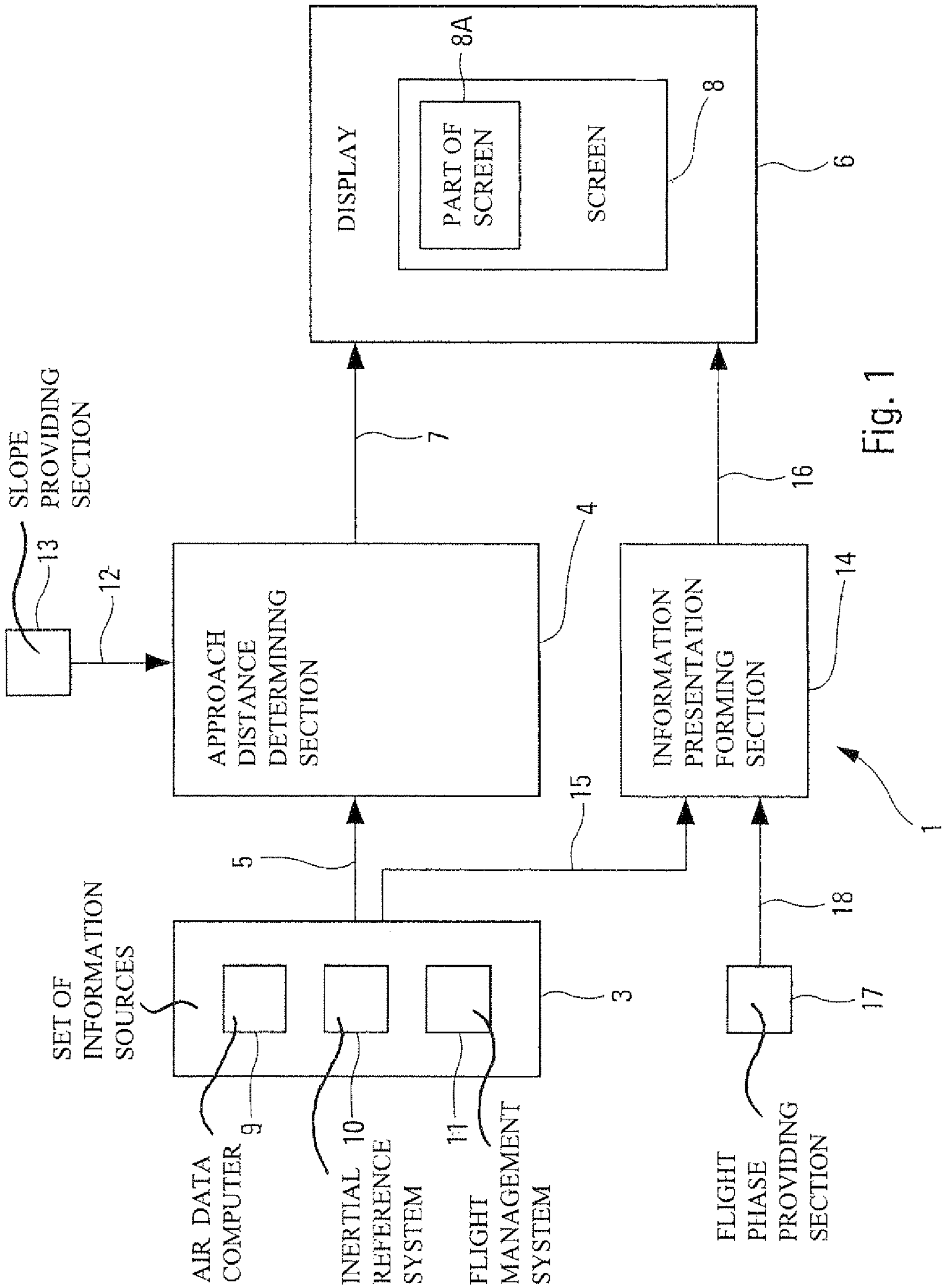
FIG. 1 is the schematic diagram of a device for aiding piloting in accordance with the invention.

The device 1 in accordance with the invention and represented diagrammatically in FIG. 1 is intended to aid a pilot to pilot an airplane A, in particular a wide-bodied transport airplane, during the approach to a landing runway 2.

According to the invention, said device 1 is of the type comprising:

- a set 3 of information sources specified hereinbelow, which makes it possible to determine the current values of flight parameters of the airplane A;
- means 4 which are connected by way of a link 5 to said set 3 of information sources and which are formed in such a way as to determine, at least with the aid of said current values received from said set 3, at least one approach distance DA which corresponds to a distance in a horizontal plane between the current position of the airplane A and a position of contact with the ground; and
- display means 6 which are connected by way of a link 7 to said means 4 and which are formed in such a way as to present to the pilot of the airplane A, on a viewing screen 8, preferably a standard navigation screen of ND ("Navigation Display") type, at least this approach distance DA, and do so as a function of flight conditions specified hereinbelow.

According to the invention, said means 4 which are intended to determine at least an approach distance DA comprise the following integrated means, not represented individually:

- means for determining along a descent profile transition points Pi (i being a variable integer) which are formed on each occasion by a particular speed Vi and a particular height hi (with respect to the ground). This descent profile illustrates an evolution in terms of speed and altitude of the airplane A between the current position and the position of contact with the ground;
- means for determining, for each of these transition points Pi, a total height HTi which represents the height at which the airplane A would be found if it had the same energy, but a zero speed; and
- means for calculating, from the current position of the airplane A and up to the ground contact position, a plurality of individual (horizontal) distances ΔXi, on each occasion between two successive transition points Pi+1 and Pi which exhibit respective total heights HTi+1 and HTi, this being done with the aid of the following equation (Eq. 0):

$$\Delta Xi = \int_{HTi}^{HTi+1} \left[ 1 \Big/ \left( \frac{dHT}{dX}(HT) \right) \right] \cdot dHT \qquad \text{(Eq. 0)}$$

in which HT is a total height and the term $$\frac{dHT}{dX}(HT)$$

depends on the total ground slopes at the limits of the relevant segment; and

- means for summing the various individual (horizontal) distances ΔXi thus calculated in such a way as to obtain said approach distance DA which therefore satisfies the following relation:

$$DA = \sum_i \Delta Xi$$

Thus, by virtue of the invention, the (horizontal) approach distance DA is calculated in a particularly accurate manner, and this calculation requires a low calculation time.

Moreover, this approach distance DA is or is not presented on the viewing screen 8 as a function of said flight conditions specified hereinbelow.

According to the invention, said descent profile is:

- either a standard descent profile which corresponds to a standard approach procedure, in accordance with usual aeronautical directives;
- or an optimized descent profile which corresponds to an optimized approach procedure making it possible to obtain a minimum approach distance. This optimized descent profile depends, in a usual manner, in particular on the aerodynamic braking capabilities of the airplane A and on current flight parameters.

Within the framework of the present invention, said set 3 of information sources may comprise in particular:

- an air data computer 9 of ADC ("Air Data Computer") type;
- at least one inertial reference system 10 of IRS ("Inertial Reference System") type; and
- a flight management system 11 of FMS ("Flight Management System") type.

In a particular embodiment, said set 3 of information sources provides said means 4 with at least some of the following current values (of which the following list comprises between parentheses the name of the corresponding information source):

- flight phase (FMS);
- lateral mode (FMS);
- required navigation performance or RNP ["Required Navigation Performance"](FMS);
- approach speed (FMS);
- landing configuration (FMS);
- wind model (FMS);
- mass of the airplane A (FMS);
- flight plan (FMS-"Navigation Database");
- latitude and longitude of the threshold 2A of the runway 2 (FMS-Navigation Database);
- Threshold Crossing Height (TCH) of the threshold 2A of the runway 2 (FMS-Navigation Database);
- slope of the last approach segment (FMS-Navigation Database);
- deceleration altitude (FMS-Navigation Database);
- altitude of the terrain (FMS-Navigation Database);
- position of the landing gear (FG standing for "Flight Guidance");
- configuration of the slats and flaps or CONF (FG);
- course and heading of the airplane A (IRS);
- latitude and longitude of the airplane A (IRS);

altitude of the airplane A (ADC);
static temperature (ADC);
temperature of the terrain (ADC);
true airspeed or TAS ["True Airspeed"] (ADC);
corrected speed or CAS ["Calibrated Air Speed"] (ADC);
Mach number (ADC);
state of the engines of the airplane (A) (FADEC standing for "Full Authority Digital Engine Control");
characteristic speed (FMS-"Performance Database"); and
total slope or data making it possible to determine it (FMS-Performance Database).

Described hereinbelow is the procedure for calculating the total height HT and the total slope γT, used within the framework of the present invention, to determine the approach distance DA.

In a standard manner, the total height HT is obtained on the basis of the following equation (Eq. 1):

$$HT = \frac{ET}{mg} = h + \frac{1}{2\cdot g}\cdot V^2 \qquad \text{(Eq. 1)}$$

in which, we have:

ET=total energy with:

$$\begin{cases} ET = Ep + Ec \\ ET = m\cdot g\cdot h + \frac{1}{2}\cdot m\cdot V^2 \end{cases}$$

Ep: the potential energy;
Ec: the kinetic energy;
h: the height above the level of the runway 2;
V: the airspeed (or TAS);
m: the mass of the airplane A; and
g: the gravitational constant.

The vertical profile used can be defined either by transition points Pi in terms of speed and height, or in terms of total height. If the speeds and heights of the transition points are not predefined, the process inverse to that which will be described hereinbelow may be used (by proceeding in altitude or speed steps, or by considering an average total slope).

Figure 2:
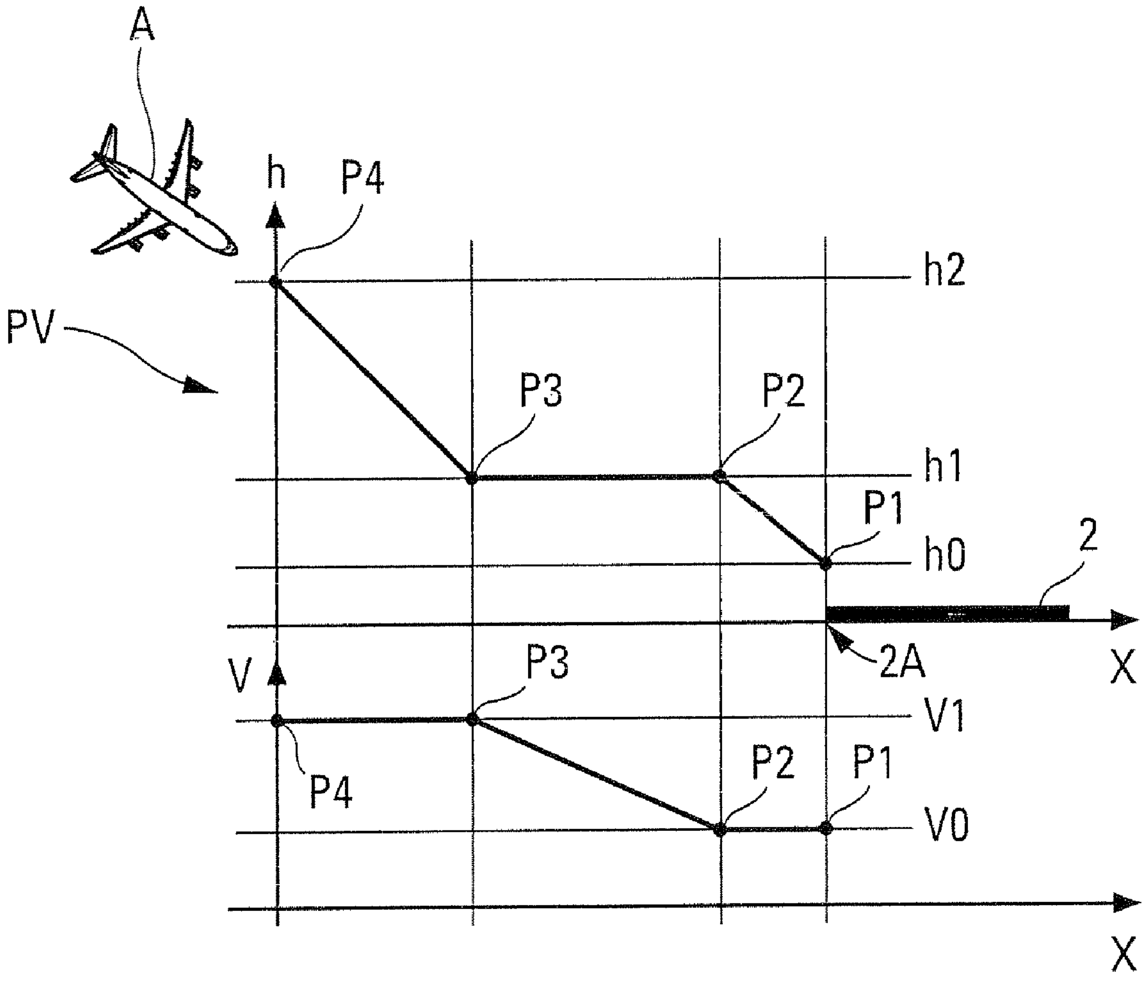
FIG. 2 is a graphic making it possible to explain a descent profile used by a device in accordance with the invention.

Represented in FIG. 2 is an example of the total-height definition of a vertical profile PV which comprises various points P1, P2, P3 and P4 exhibiting different heights Hi and speeds Vi.

On the basis of the aforesaid equation (Eq. 1), the total heights HTi which define this vertical profile at said points P1 to P4 are as follows:

| Transition point: Pi | Height: hi | Speed: Vi | Total height: HTi |
|---|---|---|---|
| P1 | h0 | V0 | $HT0 = h0 + \frac{1}{2\cdot g}\cdot V0^2$ |
| P2 | h1 | V0 | $HT1 = h1 + \frac{1}{2\cdot g}\cdot V0^2$ |
| P3 | h1 | V1 | $HT2 = h1 + \frac{1}{2\cdot g}\cdot V1^2$ |
| P4 | h2 | V1 | $HT3 = h2 + \frac{1}{2\cdot g}\cdot V1^2$ |

It will be noted that the means 4 calculate the distance traveled between two points in terms of total energies (in such a way as to calculate the distance between the current total energy of the airplane A and the transition point in terms of total energy of a given descent profile or between two transition points in terms of total energies of a given descent profile).

It is recalled that the slope γ satisfies the relation:

$$\sin(\gamma) \approx \gamma = \frac{Vz}{V} = \frac{\frac{dh}{dt}}{V}$$

By analogy, the total slope γT (which corresponds to the evolution of the total height, as a function of a horizontal distance) is defined in the following manner:

$$\sin(\gamma) \approx \gamma T = \frac{\frac{dHt}{dt}}{V}$$

$$\frac{dHT}{dt} = \frac{d}{dt}\left(h + \frac{TAS^2}{2\cdot g}\right) = \frac{dh}{dt} + \frac{TAS}{g}\cdot\frac{dTAS}{dt} = \frac{dh}{dt} + TAS\cdot\frac{A}{g}$$

$$\gamma T = \frac{Vz}{V} + \frac{A}{g}$$

Likewise, by analogy (case of small slope), we obtain:

$$\frac{dh}{dX} = \arcsin(\gamma) \approx \gamma$$

and also equation $$\frac{dHT}{dt} = \arcsin(\gamma T) \approx \gamma T = \frac{Vz}{V} + \frac{A}{g} \qquad \text{(Eq. 2)}$$

For a descent at constant airspeed:

$$\gamma T = \frac{Vz}{V} + \frac{A}{g}$$

becomes $$\gamma T \mid v = \frac{Vz}{V}$$

To simplify the notation, γT|v is subsequently replaced by γT. This amounts to saying that the total slopes available for the calculations are defined at constant speed. They are made available to the means 4 by means 13 which are connected by way of a link 12 to said means 4.

In a ground reference frame, equation (Eq. 2) becomes:

$$\frac{dHT}{dt} = \frac{Vz}{Vsol} + \frac{Asol}{g} \qquad \text{(Eq. 3)}$$

By considering a wind along X, its gradient and a longitudinal acceleration, we have:

$$Vsol = \sqrt{Vz^2 + (Vair\cdot\cos(\gamma T) + Vent)^2}$$

Now, we have $$\cos(\gamma T) \approx 1$$

and $$\gamma T = \arcsin\left(\frac{Vz}{Vair}\right) \approx \frac{Vz}{Vair},$$

i.e.

$$Vz = \gamma T \cdot Vair$$

Equation (Eq. 3) then becomes:

$$\frac{dHT}{dX} = \frac{Vair \cdot \gamma T}{\sqrt{(Vair \cdot \gamma T)^2 + (Vair + Vent)^2}} + \frac{Asol}{g} \qquad \text{(Eq. 4)}$$

$$\begin{aligned} Asol &= \left(\frac{dVent}{dt} + \frac{dVair}{dt}\right) \cdot \cos(\Delta) \\ &\approx \frac{dVent}{dt} + \frac{dVair}{dt} \\ &= \left(\frac{dVent}{dt} + \frac{dVair}{dt}\right) \cdot \frac{dh}{dh} \\ &= \left(\frac{dVent}{dh} + \frac{dVair}{dh}\right) \cdot \frac{dh}{dt} \end{aligned}$$

$$\begin{aligned} Asol &\approx \left(\frac{dVent}{dh} + \frac{dVair}{dh}\right) \cdot Vz \\ &= \left(\frac{dVent}{dh} + \frac{dVair}{dh}\right) \cdot Vair \cdot \gamma T \end{aligned}$$

Finally, we will have the following equations (Eq. 5) and (Eq. 6):

$$\frac{dHT}{dX}(\gamma T) = \frac{Vair \cdot \gamma T}{\sqrt{(Vair \cdot \gamma T)^2 + (Vair + Vent)^2}} + \frac{1}{g} \cdot \frac{dVair}{dt} \qquad *\text{(Eq. 5)}$$

which equation will be used for stepped decelerations; and $$\frac{dHt}{dX}(\gamma T) = \frac{Vair \cdot \gamma T}{\sqrt{(Vair \cdot \gamma T)^2 + (Vair + Vent)^2}} + \left(\frac{dVent}{dh} + \frac{dVair}{dh}\right) \cdot \frac{Vair \cdot \gamma T}{g} \qquad *\text{(Eq. 6)}$$

which equation will be used for descents at conventional constant speed.

On the basis of the total slope at zero acceleration, we can reconstruct the total ground slope:

$$\frac{dHT}{dX} = \frac{dHT}{dX}(\gamma T)$$

The total ground slope represents the total slope in the ground reference frame.

The total slope at zero acceleration depends on the speed and height. The total ground slope therefore depends on the total height $$\frac{dHT}{dX} = \frac{dHT}{dX}(HT)$$

To calculate the theoretical distance which will be traveled between two total energies, we integrate the following relation:

$$\frac{dHT}{dX} = \frac{dHT}{dX}(HT)$$

$$dX = \frac{1}{\frac{dHT}{dX}(HT)} dHT$$

thereby making it possible to obtain the aforesaid equation (Eq. 0):

$$\Delta X = \int_{HTi}^{HTi+1} \frac{1}{\frac{dHT}{dX}(HT)} dHT \qquad \text{(Eq. 0)}$$

On the basis of this equation (Eq. 0), by assuming γ1 to be the total ground slope at a total height HT1 and γ2 to be the total ground slope at a total height HT2, we can in this domain assume a simple analytic evolution of the total ground slope as a function of the total height.

For example, for a linear evolution, we obtain:

$$\frac{dHT}{dX}(HT) = \frac{\gamma 2 - \gamma 1}{HT2 - HT1} \cdot HT + \frac{HT1 \cdot \gamma 2 - HT2 \cdot \gamma 1}{HT1 - HT2}$$

The distance obtained in this example is then:

$$\Delta X = \frac{(HT1 - HT2)}{\gamma 1 - \gamma 2} \cdot ln\left(\left|\frac{\gamma 1}{\gamma 2}\right|\right)$$

Going back to the previous example, for an airplane A exhibiting a total height HTC lying between HT3 and HT2, the approach distance traveled DA will be estimated on the basis of the aforesaid equation (Eq. 0), namely:

$$DA = \int_{HT2}^{HTC} \frac{1}{\frac{dHT}{dX3}(HT)} dHT + \int_{HT1}^{HT2} \frac{1}{\frac{dHT}{dX2}(HT)} dHT + \int_{HT0}^{HT1} \frac{1}{\frac{dHT}{dX1}(HT)} dHT$$

with $$\frac{dHT}{dXi}(HT)$$

dependent on the total ground slopes at the limits of the segment flown.

Figure 3:
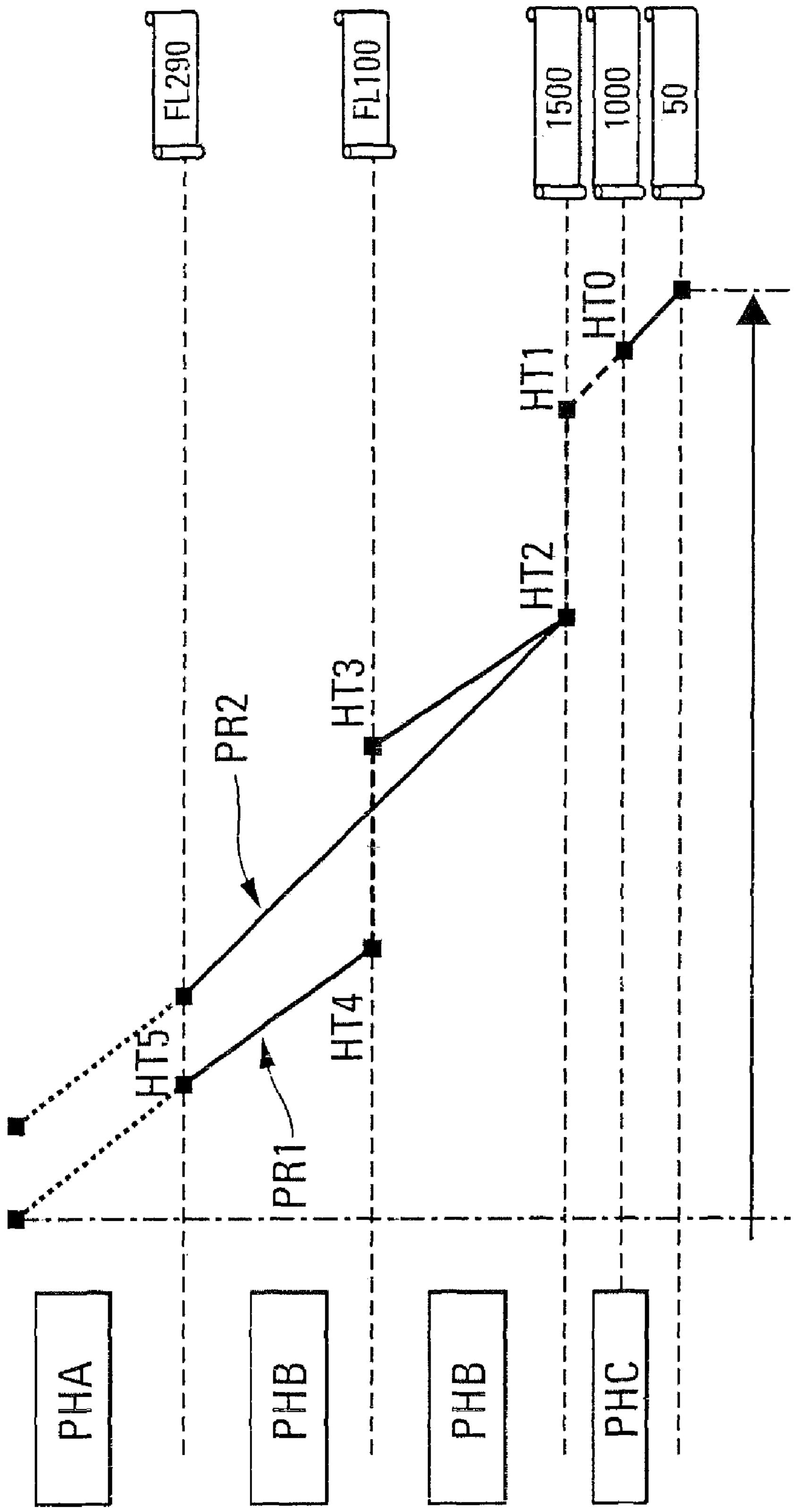
FIG. 3 diagrammatically illustrates a standard descent profile.
Figure 4:
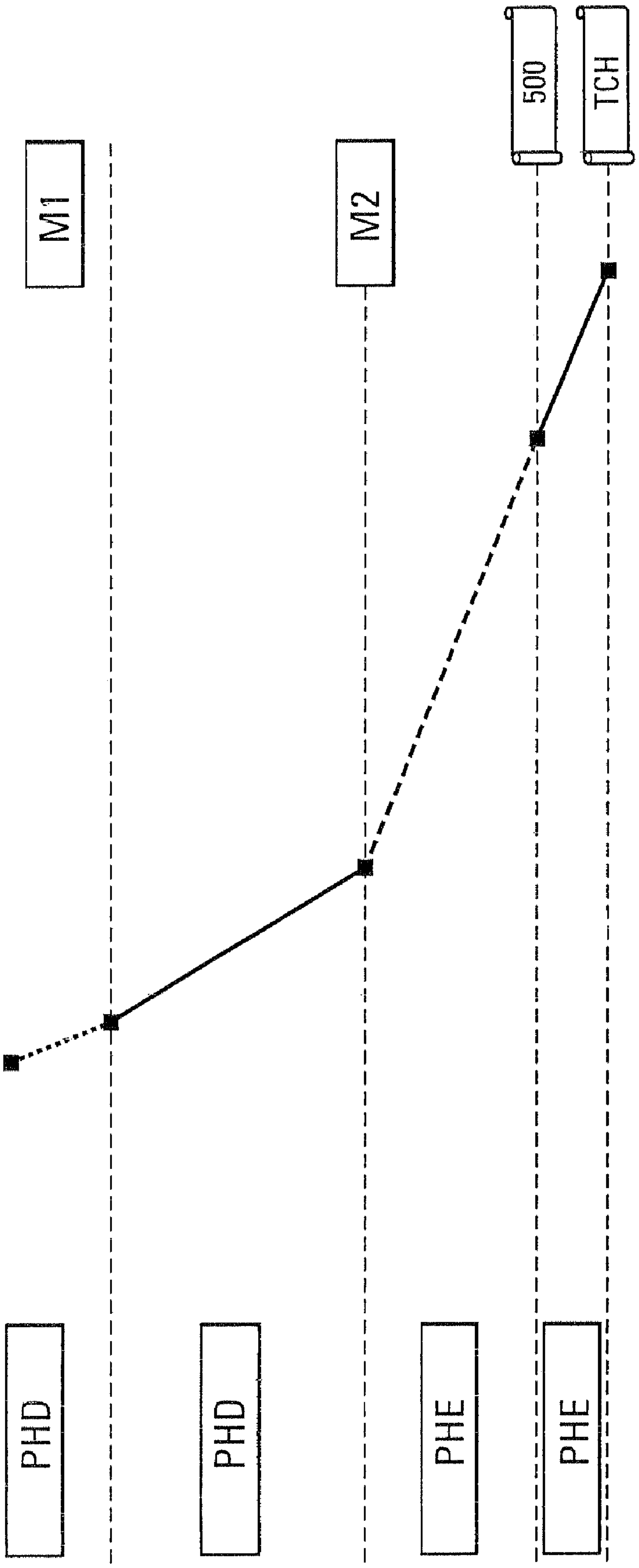
FIG. 4 diagrammatically illustrates an optimized descent profile.

This calculation procedure will be applied hereinbelow to the prediction of the ground attainment distance for an airplane A in the approach phase with a view to landing on a runway 2, for two different examples relating respectively to:

- a standard approach procedure, as represented in FIG. 3; and
- an optimized approach procedure, as represented in FIG. 4.

Represented in FIG. 3 by way of illustration is a standard descent profile representative of a standard approach procedure. In this FIG. 3:

a dotted segment (of the descent profile) corresponds to a segment at constant Mach number;

a solid segment corresponds to a segment at constant corrected speed CAS;

a dashed segment corresponds to a segment at decelerated corrected speed CAS;

PHA represents a descent phase at constant Mach number with idling thrust (control of the speed via the slope: "PA Open Descent" mode);

PHB represents a descent phase at constant corrected speed CAS with idling thrust (control of the speed via the slope: "PA Open Descent" mode). In the PHA and PHB phases, the airplane A is in a smooth configuration;

PHC represents a descent phase at an angle FPA ("Flight Path Angle");

the indications of the right part represent flight levels (standard altitude in feet) [FL290, FL100, . . . ] or heights [1500, . . . ].

Moreover, this FIG. 3 comprises two different profiles PR1 and PR2 depending on whether the speed V0 is respectively greater or else less than or equal to a predetermined value, preferably 250 knots.

In this example, the following total heights are obtained:

| Transition point | Total height | If V0 > 250 Conventional speed | If V0 < 250 Conventional speed | Geometric altitude |
|---|---|---|---|---|
| P0 | HT0 = HTAPP | VAPP | VAPP | 1000 |
| P1 | HT1 | VC1500 | VC1500 | 1500 |
| P2 | HT2 | 250 | V0 | 1500 |
| P3 | HT3 | 250 | V0 | FL100 |
| P4 | HT4 | V0 | V0 | FL100 |
| P5 | HT5 | V0 | V0 | FL290 |

In this table:

VAPP is the approach speed;

V0 is the predicted speed of the airplane A under the flight level FL290;

VC is the conventional speed;

VC1500 is the predicted speed of the airplane A at 1500 feet above the terrain;

HTAPP is the height at which the speed VAPP must be stabilized;

FL is the flight level, which is such that FLx corresponds to a height of x (in feet) multiplied by 100;

the altitude is expressed in feet (1 foot≈0.3 meters); and the speed is expressed in knots (1 knot≈0.5 m/s).

In this example, the standard approach distance DA is calculated by the means 4 by summing the distances between each of the various transition points P0 to P5, doing so using the aforesaid equation (Eq. 0) up to that of the total energy of the airplane A.

Additionally, in FIG. 4 is represented an optimized descent profile representative of an optimized approach procedure. In this FIG. 4:

a solid segment (of the profile) corresponds to a segment at constant speed;

a dotted segment corresponds to a segment with acceleration;

a dashed segment corresponds to a segment with deceleration;

PHD represents a descent phase with idling thrust (control of the speed via the slope: "PA Open Descent") mode. If there is no need to accelerate, the descent is carried out at constant speed;

PHE represents a descent phase at an angle FPA;

M1 illustrates an acceleration phase before attaining a certain speed;

M2 illustrates the interception of the last segment, with extension of the landing gear as soon as the speed is below a maximum speed of VLO type;

TCH represents the height of crossing the threshold 2A of the runway.

Figure 5:
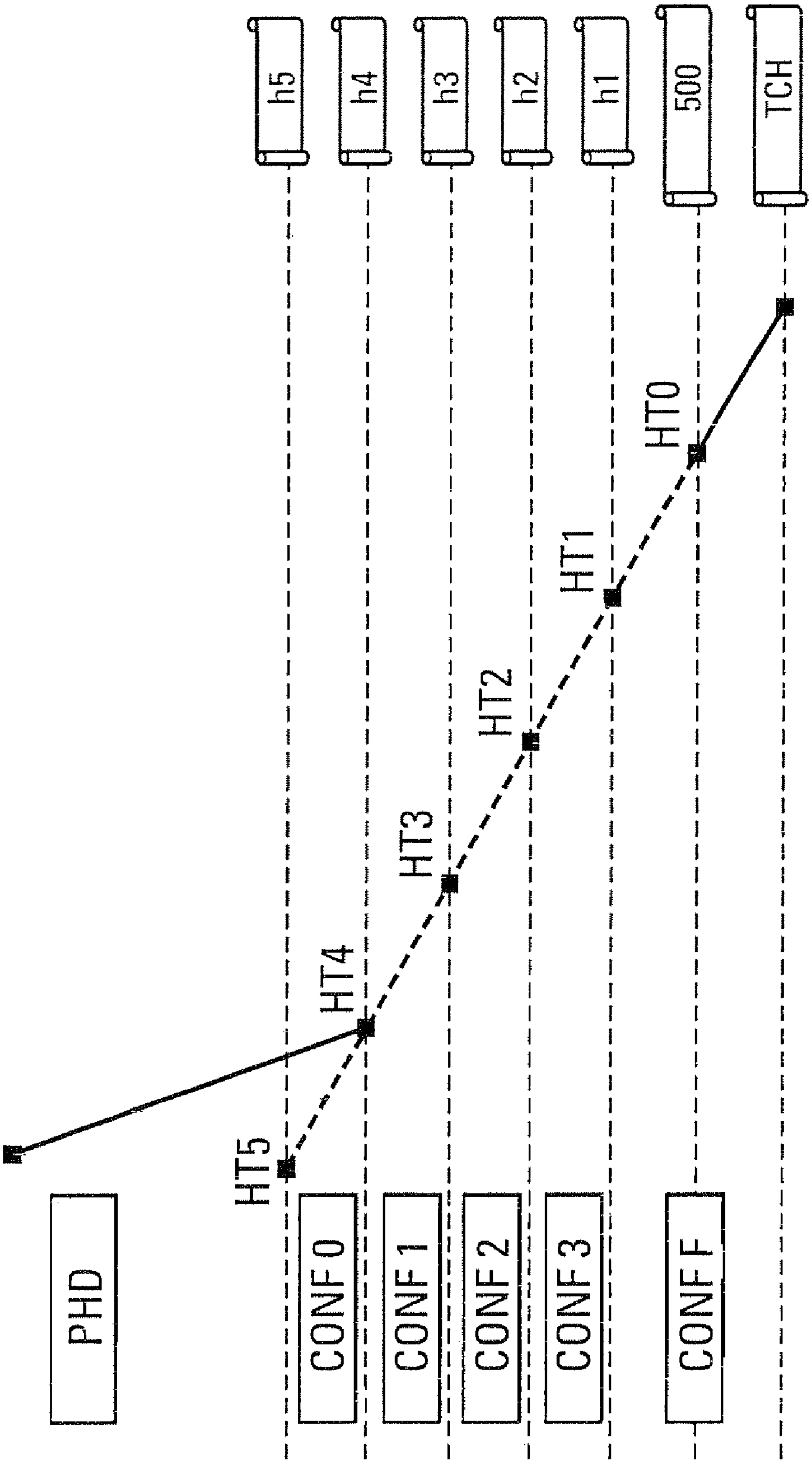
FIG. 5 shows points of transition of the profile of FIG. 4.
Figure 6:
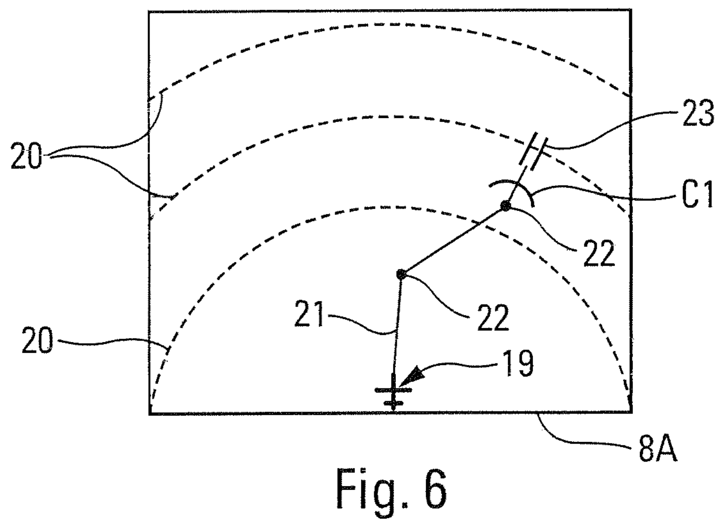
FIGS. 6 to 11 represent a part of a navigation screen, respectively for different approach phases.
Figure 7:
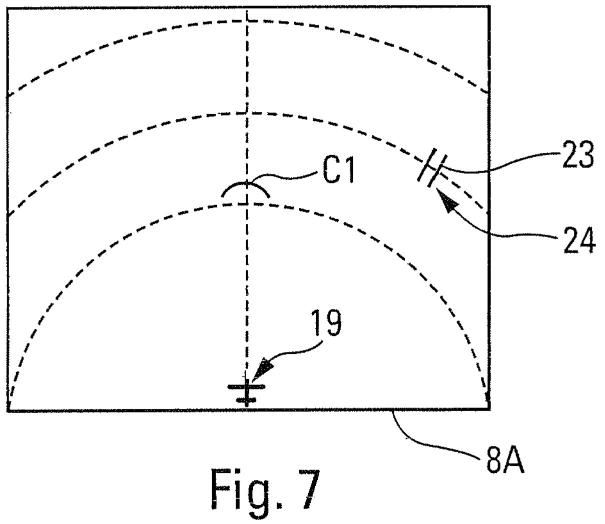

The transition points which define the profile of FIG. 4 are represented in FIG. 5. In this FIG. 5:

a solid segment represents a segment at constant corrected speed CAS; and a dashed segment represents a segment at decelerated corrected speed CAS.

These transition points are illustrated in the following table (to which the above remarks apply):

| Transition point | Total height | Speed | Geometric altitude |
|---|---|---|---|
| P0 | HT0 = HTAPP | VAPP | 500 |
| P1 | HT1 | VFE CONF F-5 | h1 |
| P2 | HT2 | VFE CONF 3-5 | h2 |
| P3 | HT3 | VFE CONF 2-5 | h3 |
| P4 | HT4 | Min (VFE CONF 1-5, 250) | h4 |
| P5 | HT5 | Min (VFE CONF 0-5, 250) | h5 |

It will be noted that VFE is a usual maximum speed with the slats and flaps brought into a particular configuration (CONF: F, 0, 1, 2, 3, 4, 5).

The calculation of the transition heights is done on the basis of the inverse of the process described previously by assuming an average total slope $$\frac{dHTi}{dXCONFi}:\ HTi = HTi-1 + \frac{\frac{\rho}{\rho 0}\cdot\frac{1}{2\cdot g}(Vi^2 - Vi-1^2)}{1-\frac{\gamma GS}{\frac{dHTi}{dXCONFi}}}$$

The geometric altitudes hi at the transition points therefore equal:

$$hi = HTi - \frac{\rho}{\rho 0}\cdot\frac{1}{2\cdot g}\cdot Vi^2$$

with:

γGS: the slope of the last approach segment;

ρ: the density of the air at the altitude of the airplane A; and

ρ0: the density of the air at sea level.

In this last example (relating to an optimized descent profile), the approach distance (namely a minimum approach distance) is calculated by the means 4 by summing the distance between the current energy of the airplane A and that of the relevant transition point by using the aforesaid equation (Eq. 0) at the distance traveled from the relevant height of the transition point to a height TCH.

Additionally, the device 1 in accordance with the invention comprises, moreover, means 14 which are connected by way of links 15 and 16 respectively to said means 3 and 6 and which are formed in such a way as to instruct the presentation of information on said screen 8. To do this, said means 14:

determine a distance to destination;

compare this distance to destination with the approach distance DA determined by the means 4; and as a function of the result of this comparison and of the current flight phase of the airplane A, which conditions illustrate said aforesaid flight conditions, instruct or otherwise the presentation of said approach distance DA on said screen 8.

The current flight phase used may in particular be provided by a usual means 17 which is connected by way of a link 18 to said means 14.

Thus, said device 1 displays the approach distance on the screen 8, preferably a navigation screen, only if this is useful to the pilot and necessary, as a function of particular flight conditions (relating in particular to the current flight phase and to the aforesaid comparison) which will be explained further hereinbelow.

The distance to destination, the calculation of which is performed by the means 14, is the distance between the airplane A and the threshold 2A of the runway 2 according to the flight plan. This calculation is carried out when particular conditions are fulfilled, such that the lateral mode is a managed mode and the required navigation performance of RNP type is below a predetermined value. If said particular conditions are not fulfilled, the distance to destination is the direct distance between the aircraft A and the threshold 2A of the runway 2. The check relating to the fact that said particular aforesaid conditions are fulfilled may, for example, be carried out by said means 17.

Additionally, said display means 6 present, on at least a part 8A of the screen 8 (corresponding to a navigation screen), said approach distance in the form of a circular arc C1, C2 which is preferably centered on a position relating to the airplane A (highlighted by an airplane symbol 19) and which illustrates said position of contact with the ground, as represented in FIGS. 6 to 11.

In these FIGS. 6 to 11, are also represented:

a usual distance graduation 20, which is defined with respect to the current position of the airplane A as illustrated by the airplane symbol 19; and a plot 21 showing a theoretical flight trajectory (preferably according to the flight plan) of the airplane A in the horizontal plane, passing through route points 22.

In a particular embodiment:

the means 4 determine two approach distances, namely a minimum approach distance and a standard approach distance which relate respectively to an optimized approach procedure and to a standard approach procedure, such as specified; and the display means 6 present (or otherwise) these two approach distances on the (navigation) screen 8 as a function of said flight conditions.

In this case, preferably, said display means 6 present, on said navigation screen 8:

said standard approach distance, in the form of a circular arc C1 which is centered on a position relating to the airplane A (symbol 19) or on a route point 22 and which illustrates the position of contact with the ground relating to a standard approach;

said minimum approach distance, in the form of a circular arc C2 which is centered on said position relating to the airplane A (symbol 19) or on a route point 22 and which illustrates the position of contact with the ground relating to an optimized approach; and a symbol 23 which illustrates the position of the landing runway 2 scheduled for the landing and which indicates at least (by its upstream end 24) the threshold 2A of this landing runway 2.

Figure 8:
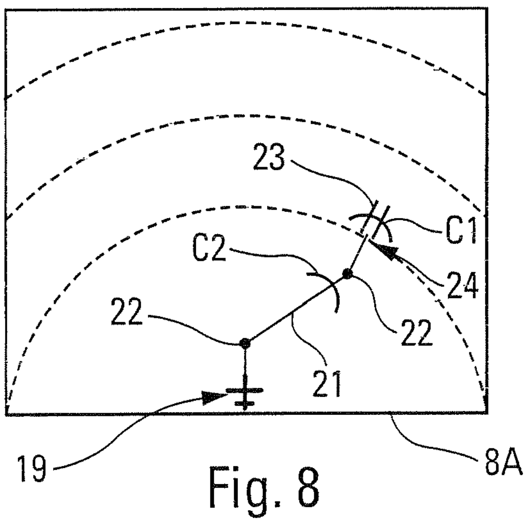
Figure 9:
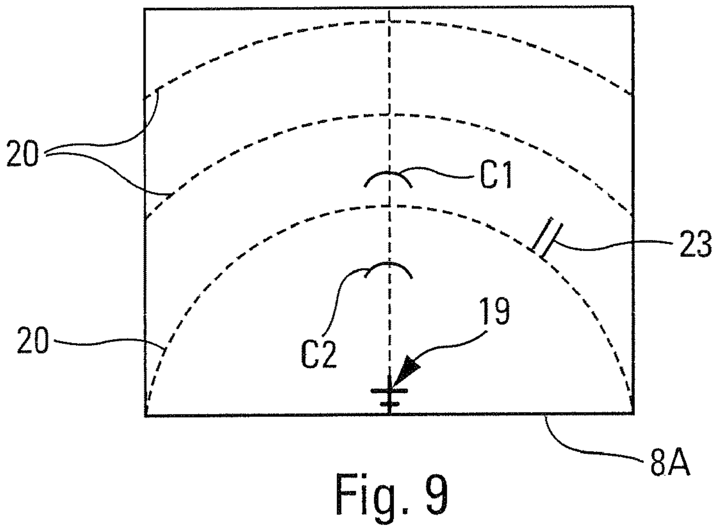
Figure 10:
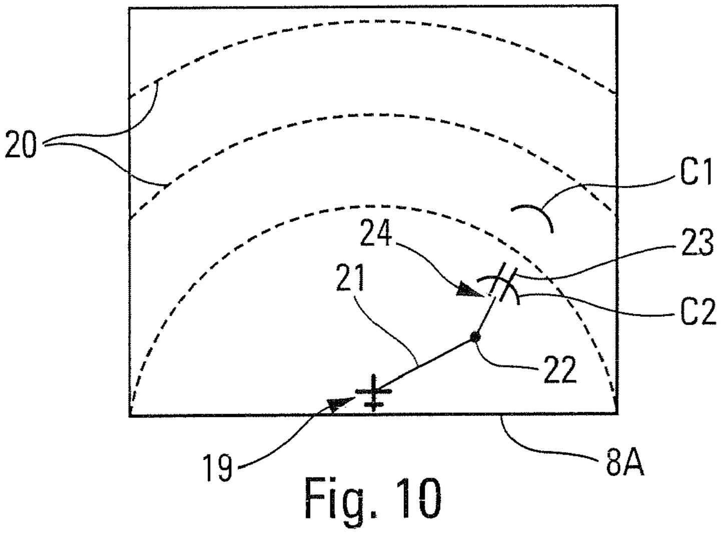
Figure 11:
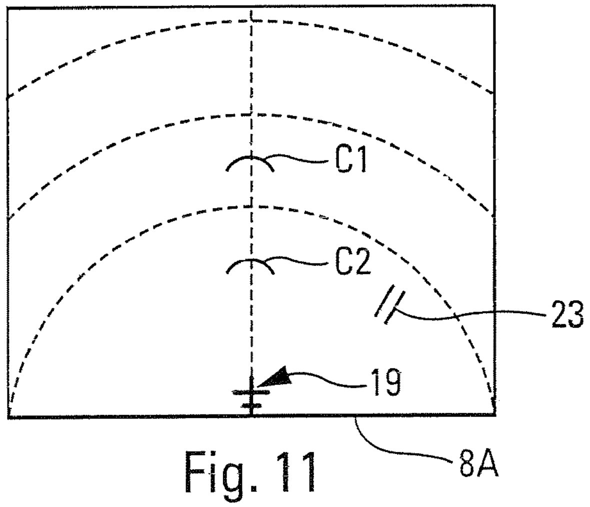

Such a display makes it possible to highlight one of the following three situations:

a normal situation (FIGS. 6 and 7), when said circular arcs C1 and C2 are situated upstream of said threshold (end 24) of the landing runway 2;

an alert situation, when said circular arc C1 is situated downstream of said threshold (end 24) of the landing runway 2 and said circular arc C2 is situated upstream of said threshold (end 24) of the landing runway 2, as represented in FIGS. 8 and 9; and an alarm situation, when said circular arcs C1 and C2 are situated downstream of said threshold (end 24) of the landing runway 2, as represented in FIGS. 10 and 11.

Consequently, in a normal situation, the pilot knows that he can continue the approach procedure in progress, which will enable him to land on the landing runway 2.

On the other hand, in an alert situation (that is to say when said circular arc C1 oversteps said threshold [end 24] of the landing runway 2), the pilot knows that it will be impossible for him to achieve stabilized-approach conditions, if he continues to fly according to the standard approach procedure in progress. However, it is possible for him to achieve stabilized-approach conditions if he flies according to an optimized approach procedure, since said circular arc C2 is still situated upstream of said threshold (end 24) of the landing runway 2. In this case, the actions that the pilot is recommended to carry out are:

to follow the optimized approach procedure; or if despite everything he intends making a standard approach, to use the air brakes and to extend the slats and the flaps as well as the landing gear earlier than scheduled, if of course the speeds so permit; or else to modify the lateral trajectory.

Furthermore, in the alarm situation, for which the two circular arcs C1 and C2 are situated beyond the threshold (end 24) of the landing runway 2, the pilot knows that in the current state it will be impossible for him to achieve stabilized-approach conditions, regardless of the approach procedure that he uses. In this case, the actions that he is recommended to carry out are, either a modification of the lateral trajectory if this is still possible, or a go-around.

Thus, by virtue of said circular arcs C1 and C2 and of said symbol 23 presented on the navigation screen 8, the device 1 affords the pilot valuable aid in taking his decision to possibly interrupt an approach phase. Moreover, in the alarm situation, he no longer needs to hesitate to carry out a go-around maneuver. This will without doubt make it possible to avoid numerous incidents and accidents during the approach phase, and to better manage the approach.

In a preferred embodiment, the means 14 instruct the display of the circular arcs C1 and C2 according to the following logic:

for a distance to destination (calculated by the means 14) below a predetermined value, for example 180 nautical miles (around 330 kilometers), and a current flight phase (received from the means 17) corresponding to a cruising phase, to a descent phase or to an approach phase, the display of the circular arc C1 is carried out on the flight plan in managed lateral mode and on the heading display in selected lateral mode. In this case:

when the standard approach distance calculated by the means 4 is less than the destination distance calculated by the means 14, one is in a situation whose criticality level is 1 on a scale of 3. In this case (FIGS. 6 and 7) the circular arc C1 presents a particular symbology. It is, for example, represented by green dots;

when the standard approach distance calculated by the means 4 is greater than the distance to destination calculated by the means 14, one is in a situation whose criticality level may be 2 or 3 on a scale of 3, as represented for example in FIGS. 8 to 11. The circular arc C1 then changes symbology and will, for example, be highlighted by a solid thick green line;

for a height below a predetermined value, for example 10 000 feet (around 3 000 meters) above the level of the runway 2, a current flight phase corresponding to a descent phase or to an approach phase, and when the approach distance calculated by the means 4 is greater than the destination distance calculated by the means 14, the display means 6 also display on the screen 8 the circular arc C2, doing so on the flight plan in managed lateral mode and on the heading display of the airplane A in selected lateral mode. In this case:

when the minimum approach distance calculated by the means 4 is less than the destination distance calculated by the means 14, one is in a situation (FIGS. 8 and 9) whose criticality level is 2 on a scale of 3. In this case the circular arc C2 presents a particular symbology, for example in the form of a dotted amber line;

when the minimum approach distance is greater than the destination distance, one is in a situation (FIGS. 10 and 11) whose criticality level is 3 on a scale of 3. The circular arc C2 then changes symbology and is highlighted, for example, by a thick solid amber line.

The distances calculated ensure a stabilized approach at least at 500 feet (around 150 meters). Under this altitude, the display of the circular arcs C1 and C2 is no longer relevant. So, under this altitude, the display means 6 no longer display said circular arcs C1 and C2, regardless of the criticality of the situation.

The global function, generated by the device 1 in accordance with the invention, therefore exhibits three degrees of criticality such that:

the first degree (or normal situation) corresponds to a phase where the energy must be considered. It strengthens awareness of the situation by confirming proper management of the energy by the pilot. No action is requested of him in this normal situation;

the second degree corresponds to a phase where the energy state of the airplane A is perturbing, but not dramatic. In this case one is in an alert situation. To attain a standard approach, the pilot must therefore act. The recommended pilot actions are generally: the use of the air brakes, the extending of the slats and flaps, as well as of the landing gear, doing so earlier than scheduled, if the speeds so permit and, if necessary, a modification of the lateral trajectory; and the third degree corresponds to a phase where the current energy will not make it possible to attain a stabilized approach at 500 feet. In this case one is in an alarm situation. The pilot actions recommended here are a modification of the lateral trajectory if possible and if time so permits, or a go-around.

Thus, by virtue of the invention, the display implemented by the device 1 is such that the indication of the degradation of a situation is progressive and permits trajectory and/or speed corrections by the pilot of the airplane A.

The invention claimed is:

1. A method for aiding the piloting of an airplane during an approach phase with a view to landing, in which method the following series of successive steps is carried out in an automatic and repetitive manner:

a) the current values of flight parameters of the airplane are determined;

b) at least one approach distance which corresponds to a distance in a horizontal plane between the current position of the airplane and a position of contact with the ground is determined at least with the aid of said current values; and c) at least this approach distance is presented to a pilot of the airplane on a viewing screen, wherein, in step b):

b1) a descent profile is determined which illustrates an evolution in terms of speed and altitude of the airplane between the current position and the position of contact with the ground;

b2) transition points which on each occasion are formed by a particular speed and a particular height are determined along said descent profile;

b3) a total height which represents the height at which the airplane would be found with the same energy, but at zero speed, is determined for each of these transition points; and b4) a plurality of individual distances ΔXi is calculated from the current position of the airplane and up to the ground contact position, on each occasion between two successive transition points Pi+1 and Pi which exhibit respective total heights HTi+1 and HTi, with the aid of the following expression:

$$\Delta Xi = \int_{HTi}^{HTi+1} \left[ 1 \Big/ \left( \frac{dHT}{dX}(HT) \right) \right] \cdot dHT$$

in which HT is the total height; and b5) the various individual distances calculated in step b4) are summed so as to obtain said approach distance.

2. The method as claimed in claim 1, wherein said descent profile is a standard descent profile which corresponds to a standard approach procedure.

3. The method as claimed in claim I, wherein said descent profile is an optimized descent profile which corresponds to an optimized approach procedure making it possible to obtain a minimum approach distance.

4. The method as claimed in claim I, wherein in step c), said approach distance is presented on the viewing screen in the form of a circular arc which depends on a position relating to the airplane and which illustrates said position of contact with the ground.

5. The method as claimed in claim 1, wherein in step b), two approach distances are determined, namely a minimum approach distance and a standard approach distance which relate respectively to an optimized approach procedure and to a standard approach procedure; and in step c), these two approach distances are presented on the viewing screen.

6. The method as claimed in claim 1, wherein in step c), a distance to destination is determined;

the approach distance determined in step b) is compared with this distance to destination; and as a function of the result of this comparison and of the current flight phase of the airplane, said approach distance is or is not presented on the viewing screen.

7. A method for aiding the piloting of an airplane during an approach phase with a view to landing, in which method the following series of successive steps is carried out in an automatic and repetitive manner:

a) the current values of flight parameters of the airplane are determined;

b) at least one approach distance which corresponds to a distance in a horizontal plane between the current position of the airplane and a position of contact with the ground is determined at least with the aid of said current values; and c) at least this approach distance is presented to a pilot of the airplane on a viewing screen, wherein, in step b):

b1) a descent profile is determined which illustrates an evolution in terms of speed and altitude of the airplane between the current position and the position of contact with the ground;

b2) transition points which on each occasion are formed by a particular speed and a particular height are determined along said descent profile;

b3) a total height which represents the height at which the airplane would be found with the same energy, but at zero speed, is determined for each of these transition points; and b4) a plurality of individual distances ΔXi is calculated from the current position of the airplane and up to the ground contact position, on each occasion between two successive transition points Pi+1 and Pi which exhibit respective total heights HTi+1 and HTi, with the aid of the following expression:

$$\Delta Xi = \int_{HTi}^{HTi+1}\left[1\Big/\left(\frac{dHT}{dX}(HT)\right)\right]\cdot dHT$$

in which HT is the total height; and b5) the various individual distances calculated in step b4) are summed so as to obtain said approach distance, wherein:

in step c), the following are presented on said viewing screen:

a standard approach distance, in the form of a first circular arc which depends on a position relating to the airplane and which illustrates the position of contact with the ground relating to a standard approach;

a minimum approach distance, in the form of a second circular arc which depends on said position relating to the airplane and which illustrates the position of contact with the ground relating to an optimized approach; and a symbol which illustrates the position of a landing runway scheduled for the landing and which indicates at least the threshold of this landing runway, in such a way as to highlight one of the following three situations:

a normal situation, when said first and second circular arcs are situated upstream of said threshold of the landing runway;

an alert situation, when said first circular arc is situated downstream of said threshold of the landing runway and said second circular arc is situated upstream of said threshold of the landing runway; and an alarm situation, when said first and second circular arcs are situated downstream of said threshold of the landing runway.

8. A device for aiding the piloting of an airplane during an approach phase with a view to landing, said device comprising:

a set of information sources that provide the current values of flight parameters of the airplane;

an approach distance determining section that determines at least one approach distance which corresponds to a distance in a horizontal plane between the current position of the airplane and a position of contact with the ground at least with the aid of said current values; and a display that presents to a pilot of the airplane, on a viewing screen, at least this approach distance, wherein said approach distance determining section comprises:

a transition point determining section that determines, along a descent profile, transition points which are formed on each occasion by a particular speed and a particular height, said descent profile illustrating an evolution in terms of speed and altitude of the airplane between the current position and the position of contact with the ground;

a height determining section that determines, for each of these transition points, a total height which represents the height at which the airplane would be found with the same energy, but at zero speed; and a calculator that calculates, from the current position of the airplane and up to the ground contact position, a plurality of individual distances ΔXi, on each occasion between two successive transition points Pi+1 and Pi which exhibit respective total heights HTi+1 and HTi, with the aid of the following expression:

$$\Delta Xi = \int_{HTi}^{HTi+1}\left[1\Big/\left(\frac{dHT}{dX}(HT)\right)\right]\cdot dHT$$

in which HT the is total height; and a summer that sums the various individual distances ΔXi thus calculated in such a way as to obtain said approach distance.

9. The device as claimed in claim 8, which comprises, moreover, a controller that controls said display concerning the displaying of said approach distance.

10. An airplane, which comprises a device such as that specified under claim 8.

* * * * *